United States Patent
Barve

(10) Patent No.: US 8,099,643 B2
(45) Date of Patent: Jan. 17, 2012

(54) MINIMIZING SLOT WASTAGE USING OVERLAPPING HARQ REGIONS IN OFDMA WIMAX SYSTEM

(75) Inventor: Satyen D. Barve, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 884 days.

(21) Appl. No.: 12/139,726

(22) Filed: Jun. 16, 2008

(65) Prior Publication Data

US 2009/0313515 A1      Dec. 17, 2009

(51) Int. Cl.
- H04L 1/18 (2006.01)
- H04B 17/00 (2006.01)
- H04W 4/00 (2009.01)
- H04W 36/00 (2009.01)
- H04W 72/00 (2009.01)

(52) U.S. Cl. ........ 714/748; 714/749; 375/224; 370/328; 370/330; 370/331; 455/436; 455/443; 455/444; 455/450; 455/451

(58) Field of Classification Search .......... 714/748, 714/749; 375/224; 370/328, 330, 331; 455/436, 455/443, 444, 450, 451
See application file for complete search history.

(56) References Cited

U.S. PATENT DOCUMENTS

| | | | | |
|---|---|---|---|---|
| 7,826,848 B2 * | 11/2010 | Tao et al. | | 455/436 |
| 7,965,683 B2 * | 6/2011 | Mu et al. | | 370/330 |
| 2008/0009285 A1 * | 1/2008 | Cho et al. | | 455/435.1 |
| 2008/0009294 A1 * | 1/2008 | Cho et al. | | 455/451 |
| 2008/0176577 A1 * | 7/2008 | Bourlas et al. | | 455/454 |
| 2009/0092066 A1 * | 4/2009 | Chindapol et al. | | 370/277 |
| 2009/0252070 A1 * | 10/2009 | Connors et al. | | 370/311 |

FOREIGN PATENT DOCUMENTS

WO    2006039812 A1    4/2006

OTHER PUBLICATIONS

Takeda et al., Throughput of DS-CDMA HARQ With Overlap Frequency-Domain Equalization, 2006, IEEE. pp. 1-5.*
P802.16Rev2/D2 (Dec. 2007), Part 16: Air Interface for Broadband Wireless Access Systems, IEEE WirelessMAN 801.16, Copyright 2007, Sections 6.3.3.7 and 8.4.5.3.21.

* cited by examiner

Primary Examiner — John J Tabone, Jr.

(57) ABSTRACT

A method and system for minimizing slot wastage by overlapping HARQ regions in a communication system. A control region allocation (CRA) utility defines a group of HARQ regions for transmission of control data. A HARQ region definition includes a starting symbol and a starting sub-channel number for the HARQ region, a number of symbols and a number of sub-channels to define the dimensions of the region and the slot duration for each sub-burst in a sequence of allocated sub-bursts. The CRA utility overlaps one HARQ region with the other to minimize slot wastage. The slots that carry data in one HARQ region overlap un-used slots in another HARQ region or are overlapped with a dummy allocation in the other HARQ region. Since mobile stations do not carry data for the slots with a dummy allocation, the overlap of HARQ regions avoids conflict with the HARQ operation.

18 Claims, 5 Drawing Sheets

MINIMIZING SLOT WASTAGE USING OVERLAPPING HARQ REGIONS IN OFDMA WIMAX SYSTEM

BACKGROUND

1. Technical Field

The present invention generally relates to wireless communication systems and in particular to signaling in wireless communication systems.

2. Description of the Related Art

The air interface using Orthogonal Frequency Division Multiple Access (OFDMA) physical layer (PHY) in 802.16e Worldwide Interoperability for Microwave Access (WiMAX) system is typically split into 5 ms frames comprising of a downlink (DL) sub-frame and an uplink (UL) sub-frame. The DL sub-frame is further divided into regions. The Institute of Electrical and Electronics Engineers (IEEE) 802.16e specification defines the regions to be independent rectangular collection of slots (i.e., a minimal unit of time-frequency resource used to carry data in OFDMA PHY). Each Hybrid Automatic Repeat Request (HARQ) region definition and sub-burst allocation within the HARQ region adds DL MAP overhead, thus expanding the DL MAP (i.e., a collection of slots carrying control information to allocate DL/UL bandwidth) which occupies DL slots in a vertical raster fashion as depicted in FIG. 2. The HARQ region definition includes a starting symbol and starting sub-channel number for the HARQ region, a number of symbols and a number of sub-channels to define the dimensions of the region, and a duration, in slots, for each sub-burst in the sequence the sub-bursts are allocated within the HARQ region. One HARQ region accommodates a maximum of 15 (16 with 802.16e Corrigendum 2) HARQ sub-bursts.

The majority of the mobile station/user (MS) population in WiMAX is expected to be either HARQ capable (i.e., able to perform HARQ retransmissions and combining) or capable of decoding the HARQ region. Therefore most of the allocations (except the broadcast data and DL data during the initial network entry procedure when new MS capability is unknown) are expected to be in the DL HARQ regions.

The rectangular shape of the HARQ regions and the limit of 15 (16 with 802.16e Corrigendum 2) sub-bursts per region lead to slot wastage in individual HARQ regions. This slot wastage increases as more HARQ regions are defined. The limit of concurrent bursts (number of bursts that may be assigned to an MS within a symbol time per DL frame) aggravates this problem as more HARQ regions need to be defined even when the number of sub-bursts per region limit is not met for an existing HARQ region.

Typically "stacking" (i.e., a technique by which individual HARQ regions are placed on top of each other in sub-channel dimension) may be used to minimize this slot wastage. However a transmit Adaptive Array (TxAA) system requires each HARQ sub-burst to range the entire range of major sub-channel groups, a predefined collection of 4 or 6 sub-channels. Consequently, stacking of HARQ regions within the same slot duration is very complex. The HARQ regions typically span the entire range of sub-channels available within the DL sub-frame. When TxAA diversity is enabled this slot wastage is even more significant.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
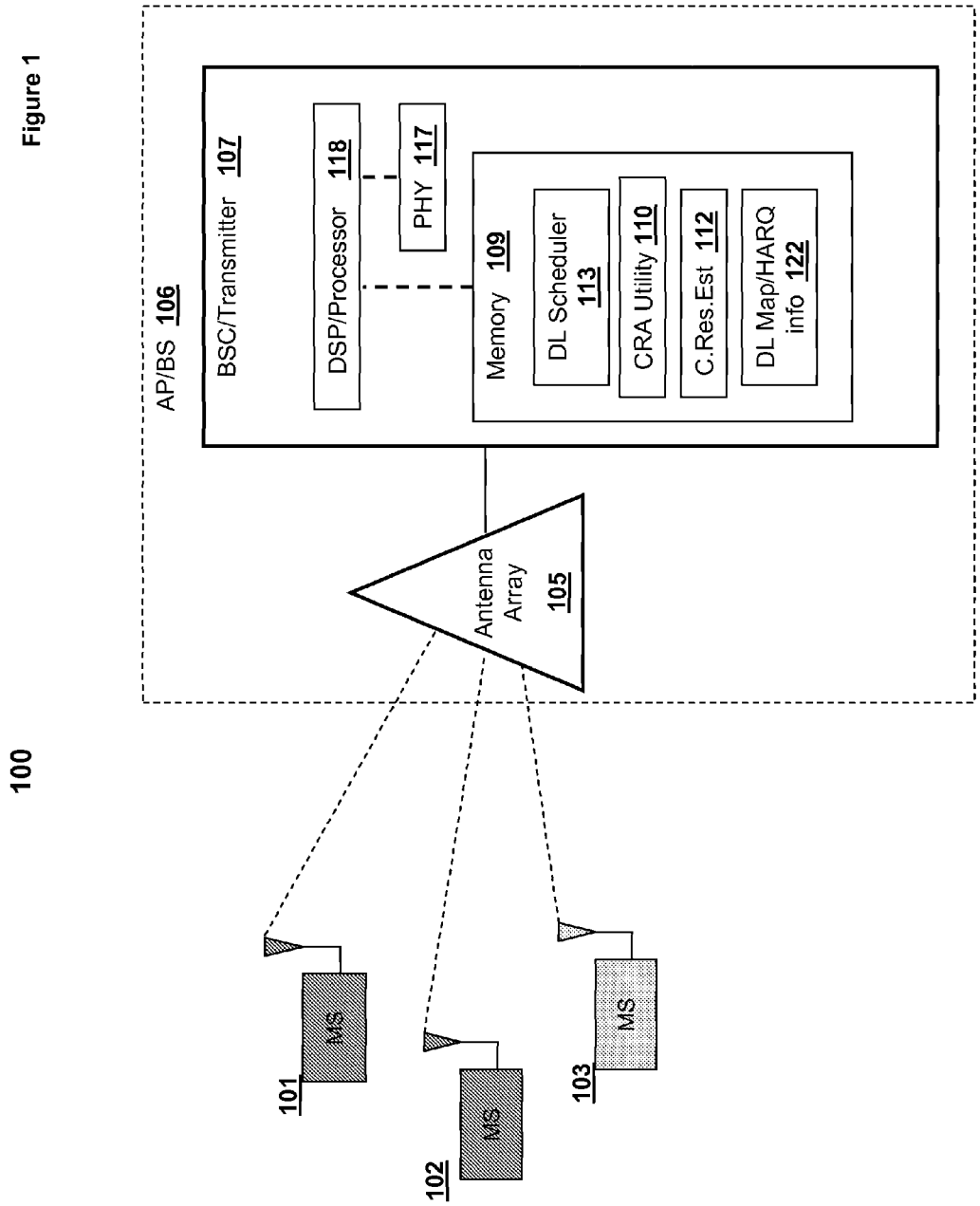
FIG. 1 is a block diagram representation of a data processing system, according to one embodiment.

The illustrative embodiments provide a method and system for minimizing slot wastage by overlapping HARQ regions in a communication system. A control region allocation (CRA) utility defines a group of HARQ regions for transmission of control data. A HARQ region definition includes a starting symbol and a starting sub-channel number for the HARQ region, a number of symbols and a number of sub-channels to define the dimensions of the region and the slot duration for each sub-burst in a sequence of allocated sub-bursts. The CRA utility overlaps one HARQ region with the other to minimize slot wastage. The slots that carry data in one HARQ region overlap un-used slots in another HARQ region or are overlapped with a dummy allocation in the other HARQ region. Since mobile stations do not carry data for the slots with a dummy allocation, the overlap of HARQ regions avoids conflict with the HARQ operation.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to FIG. 1, there is illustrated a wireless communication system 100 according to an embodiment of the present invention. Communication system 100 comprises multiple mobile stations (MSs) 101, 102, and 103 (three shown), which all wirelessly communicate with a base station 106 via a number ("N") of receiving/transmitting antennas, collectively illustrated as antenna array 105. The base station 106 also is referred to herein as an access point (AP). Base station 106 includes a transceiver (not shown), which comprises a receiver section and a transmitter section, and a base station controller (BSC) 107. Communication system 100 also comprises "N" channels/paths by which each MS 101, 102, 103 communicates with (i.e., transmits to or receives data from) base station 106.

BSC 107 comprises a DSP/Processor 118 and a Memory 109. Memory 109 comprises a Channel Response Estimator 112, PHY (logic) 117, a DL MAP/HARQ information module 122, a control region allocation (CRA) utility 110, a downlink (DL) scheduler 113, and a channel estimator 112.

In actual implementation, DL scheduler 113, PHY 117, channel response estimator 112 and CRA utility 110 may be combined as a single component, herein collectively referred to as CRA utility 110, to collectively provide the various functions of each individual component. For simplicity, CRA utility 110 is illustrated and described as a stand alone or separate software/firmware component, which provides specific functions as described below.

Among the software code/instructions/logic provided by DL scheduler 113, DL MAP-HARQ (control) information module 122, channel response estimator 112 and CRA utility 110, and which are specific to the invention, are: (a) logic for defining a group of HARQ regions for transmission of control data; (b) logic for overlapping a number of HARQ regions; and (c) logic for expanding a DL MAP based on a group of definition factors used to define the HARQ region. For simplicity of the description, the collective body of code that enables these various features is referred to hereinafter as CRA utility 110.

Figure 2:
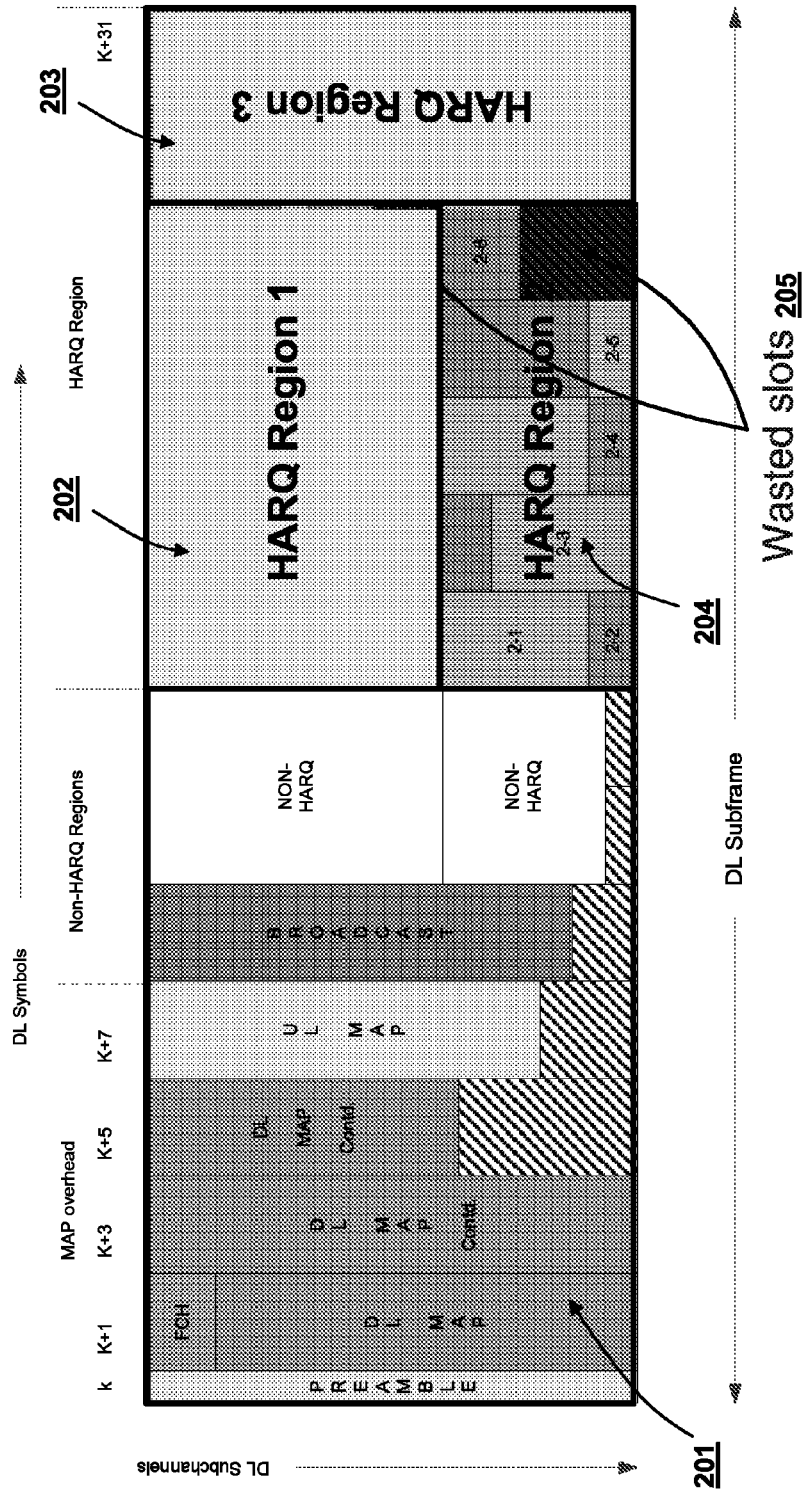
FIG. 2 illustrates a group of non-overlapping HARQ regions, according to the prior art.

FIG. 2 illustrates a group of non-overlapping HARQ regions in a DL sub-frame 200 according to the prior art. Sub-frame 200 comprises a DL MAP region 201 and multiple HARQ regions, depicted in FIG. 2 as HARQ Region 1 202, HARQ Region 2 204, and HARQ Region 3 203. Sub-frame 200 also comprises a group of un-utilized slots which are collectively illustrated as wasted slots 205. The Institute of Electrical and Electronics Engineers (IEEE) 802.16e specification defines the regions to be independent rectangular collection of slots (i.e., a minimal unit of time-frequency resource used to carry data in OFDMA PHY). Each Hybrid Automatic Repeat Request (HARQ) region definition and sub-burst allocation within the HARQ region adds DL MAP overhead, thus expanding DL MAP region 201 (i.e., a collection of slots carrying control information to allocate DL/UL bandwidth) which occupies DL slots in a vertical raster fashion as depicted in FIG. 2. That is, each allocation in a HARQ region adds an allocation Information Element (IE) to the DL MAP. This addition increases the DL MAP size and, correspondingly, increases the size of the vertical raster of the DL MAP, measured in a number of slots. Once the DL MAP takes up all the slots available under a slot duration (2 symbols wide in the time domain) the DL MAP runs over to the next slot duration, thus resulting in an 'expansion' of the DL MAP region. Each HARQ region 202, 203, 204 accommodates a maximum of 15 (16 with 802.16e Corrigendum 2) HARQ sub-bursts.

The rectangular shape of the HARQ regions and the limit of 15 (16 with 802.16e Corrigendum 2) sub-bursts per region lead to a potential waste of slots (e.g., wasted slots 205 in HARQ regions 1 202 and 2 204) in each individual HARQ region. This slot wastage increases as more HARQ regions are defined. The limit of concurrent bursts (number of bursts that may be assigned to an MS within a symbol time per DL frame) aggravates this problem as more HARQ regions may need to be defined even when the number of sub-bursts permitted per region limit may not be met for existing HARQ regions.

Figure 3:
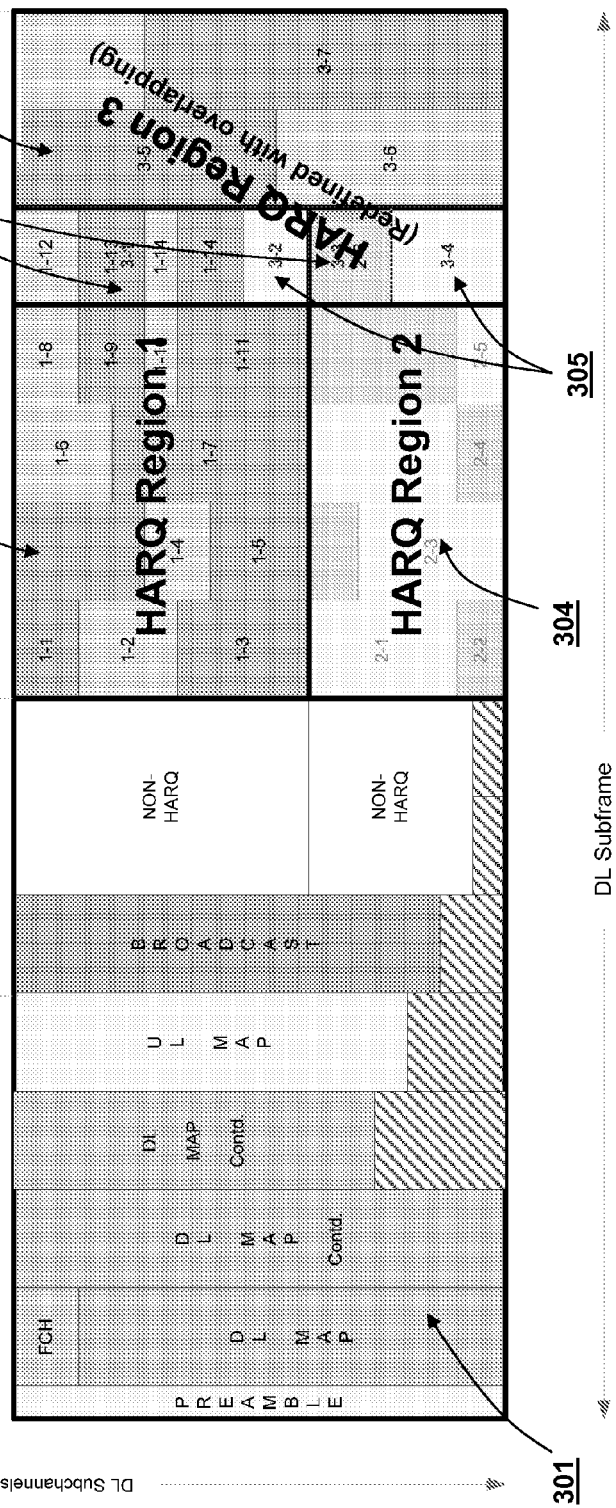
FIG. 3 illustrates a group of overlapping HARQ regions, according to one embodiment.

With reference now to FIG. 3, a scheduling, by CRA utility 110, of a group of overlapping HARQ regions in a DL sub-frame 300 is illustrated according to an embodiment of the invention. Sub-frame 300 comprises a DL MAP region 301 and multiple HARQ regions, that is, HARQ Region 1 302, HARQ Region 2 304, and HARQ Region 3 303. Sub-frame 300 also comprises data sub-bursts 3-1, 3-2, 3-3 and 3-4. Sub-bursts 3-2 and 3-4 are collectively illustrated as overlapping data sub-bursts 305. Sub-bursts 3-1 and 3-3 are collectively illustrated as overlapping dummy sub-bursts 306.

In sub-frame 300, CRA utility 110 schedules an overlap of the HARQ regions 1 302, 2 304, and 3 303. An overlap of regions may be regarded as an allocation of the same channel resources to multiple HARQ regions, based on DL MAP definition.

Each of the HARQ regions 1 302, 2 304, and 3 303 is defined by an individual HARQ region allocation in DL MAP 301. DL MAP 301 allows for a particular group of slots to be allocated as part of multiple sub-bursts in multiple HARQ regions. The slots that carry data in one HARQ region, e.g., HARQ region 1 302, are overlapped with dummy allocation in another HARQ region, e.g., HARQ region 3 303, that is allocated to a padding connection identifier (CID). Thus, PHY 117 is instructed not to carry data for those slots (having a dummy allocation) as part of the latter region, i.e., HARQ region 3 303). Since an MS ignores the slots carrying padding CID, such an overlap of HARQ regions does not interfere with proper HARQ operation.

CRA utility 110 minimizes the slot wastage, i.e., slots 205, described in FIG. 2. In particular, slots that are un-allocated (i.e., which are otherwise wasted in conventional systems) in HARQ region 1 302 and HARQ region 2 304 are utilized by overlapping HARQ Region 3 303 on top of HARQ regions 1 and 2. More particularly, sub-bursts 3-1, 3-2, 3-3 and 3-4 of HARQ region 3 303 are scheduled to overlap sub-bursts 1-12 through 1-15 of HARQ Region 1 302 and sub-burst 2-6 of HARQ Region 2 304. Sub-bursts 3-1 and 3-3 306 are padding sub-bursts of HARQ Region 3 303 and overlap the sub-bursts already allocated from region 1 302 and 2 304, and the corresponding slots therefore are not reallocated to carry new data as part of HARQ Region 3 303. However the data sub-bursts 3-2 and 3-4 305 are data sub-bursts of HARQ Region 3 303 and carry valid data as part of HARQ Region 3 303 only. As sub-bursts 3-2 and 3-4 305 also overlap the sub-bursts allocated from regions 1 302 and 2 304, the overlap of sub-bursts 3-2 and 3-4 results in a utilization, for data transmission, of wasted slots from regions 1 302 and 2 304. By combining the definition of overlapping sub-bursts within the region definition of HARQ Region 3 303, additional MAP overhead to define a new HARQ region for the overlap may also be avoided.

Figure 4:
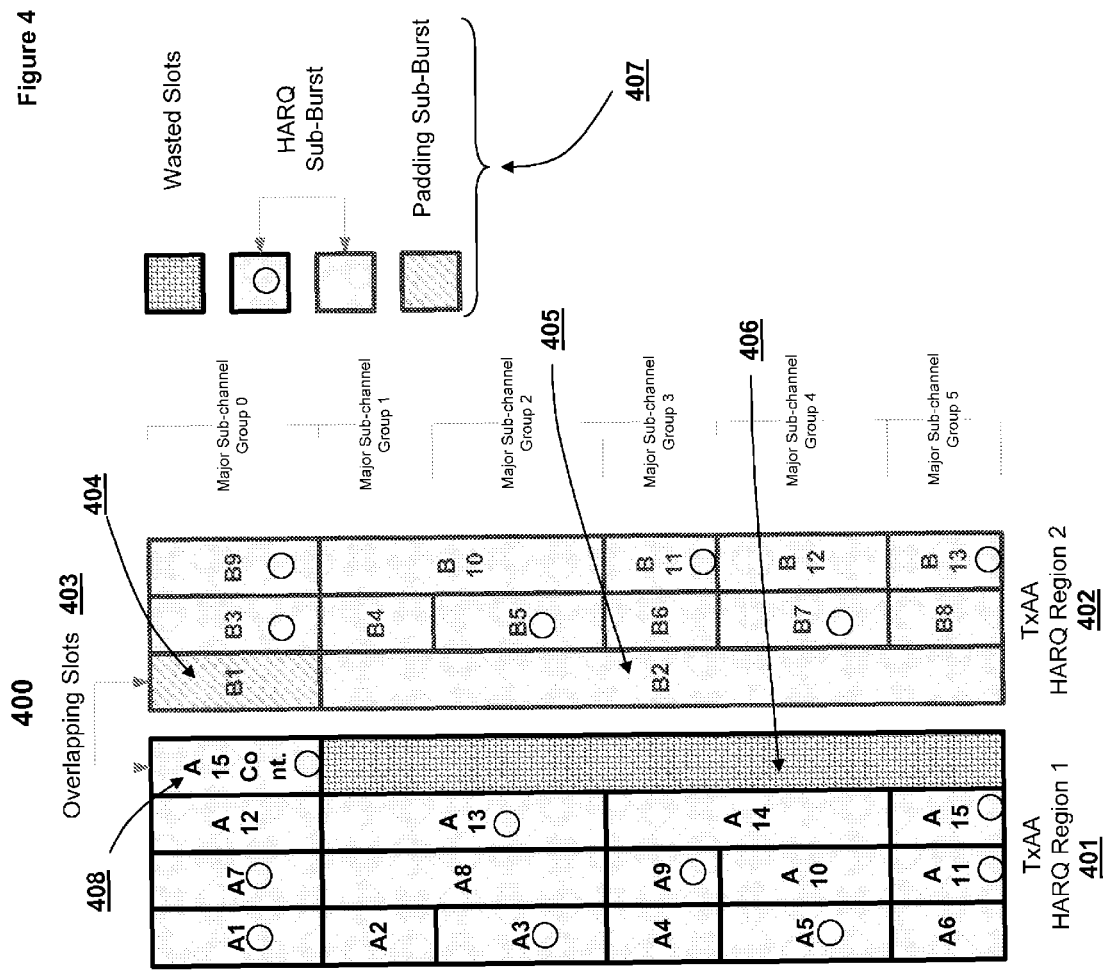
FIG. 4 illustrates a group of overlapping HARQ regions with TxAA diversity, according to one embodiment.

FIG. 4 is a block diagram illustrating a scheduling, by CRA utility 110, of a group of overlapping HARQ regions in a DL sub-frame 400 in a Transmit Antenna Array (TxAA) system, including a diagram key, according to an embodiment of the invention. As depicted in FIG. 4, sub-frame 400 is spread across multiple major sub-channel groups, that is, major sub-channel groups 0-5 (six shown). Further, sub-frame 400 comprises multiple HARQ regions, that is, HARQ Region 1 401 and HARQ Region 2 402, and an overlapping slots region 403. Sub-frame 400 also comprises multiple data sub-bursts, such as data sub-burst A-15 408, a padding sub-burst B-1 404, and "wasted" slots 406. Overlapping with "wasted" slots 406 is a data sub-burst B-2 405 of HARQ Region 2 402. Additionally, key 407 is included in sub-frame 400.

In sub-frame 400, the wasted slots 406 of HARQ Region 1 401 are utilized by overlapping an entire last slot duration of HARQ Region 1 401 with an entire first slot duration of HARQ Region 2 402. In the major sub-channel group 0, only the HARQ data sub-burst A-15 408 carries data. Correspondingly, the DL MAP defines sub-burst B1 404 of HARQ Region 2 402 as a padding sub-burst and informs PHY 117 not to transmit padding data over the air. Data sub-burst B-2 405 of HARQ Region 2 402 utilizes "wasted" slots 406 of HARQ Region 1 401 and major sub-channel groups 1-5 (with an aid of a data sub-burst allocation defined in the DL MAP) over the air. As a result and depending on the channel bandwidth, such overlap scheduling of otherwise wasted slots may result in savings that may range anywhere between 4 to 24 slots. The added overhead of defining a padding sub-burst in the DL MAP is easily compensated by the savings in utilizing, for data sub-bursts, "wasted" slots 406. By reducing the control overhead of defining the allocations, CRA utility 110 ultimately increases the bandwidth for the transmission of subscriber data.

Figure 5:
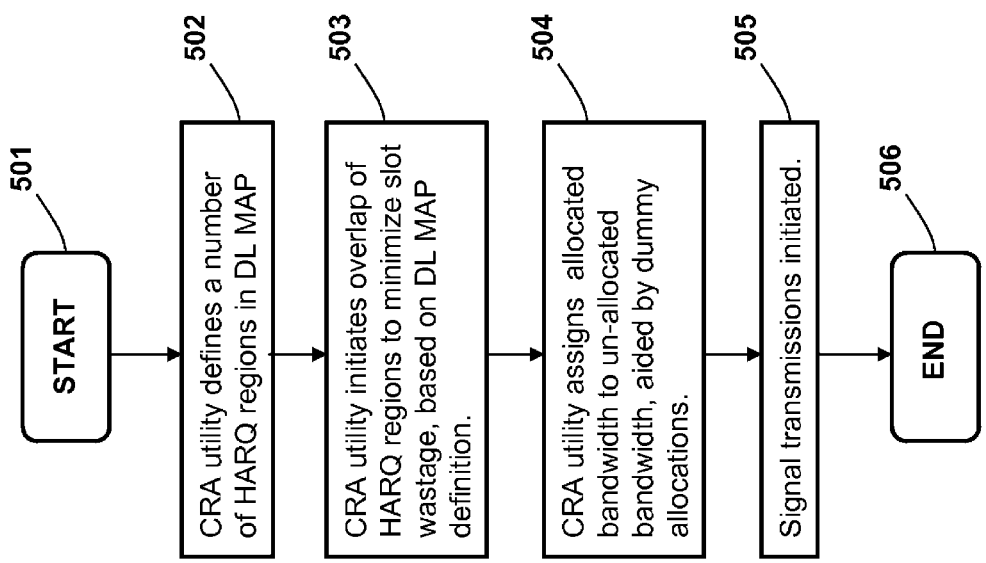
FIG. 5 is a flow chart illustrating the process of overlapping HARQ regions in order to minimize slot wastage, according to one embodiment.

FIG. 5 is a flow chart illustrating a method by which the above processes of the illustrative embodiments are completed. Although the methods illustrated in FIG. 5 may be described with reference to components shown in FIGS. 1, 3, and 4, it should be understood that this is merely for convenience and alternative components and/or configurations thereof can be employed when implementing the various methods. Key portions of the methods may be completed by CRA utility 110 executing within BSC 107 and controlling specific operations of/on BS 106, and the methods are thus described from the perspective of either/both CRA utility 110 and BSC 107.

The process of FIG. 5 begins at initiator block 501 and proceeds to block 502, at which CRA utility 110 defines a number of HARQ regions in a DL MAP. A HARQ region definition includes a starting symbol and a starting sub-channel number for the HARQ region, a number of symbols and a number of sub-channels to define the dimensions of the region, and the slot duration for each sub-burst in a sequence of allocated sub-bursts. At block 503, CRA utility 110 initiates an overlap of HARQ regions to minimize slot wastage, based on the DL MAP definition. CRA utility 110 identifies the slots in one or more HARQ regions which are unallocated and requires utilization in order to reduce slot wastage. CRA utility 110 also identifies a number of slots which are allocated data in another HARQ region. At block 504, CRA utility 110 assigns allocated bandwidth to un-allocated bandwidth, aided by dummy allocations. CRA utility 110 initiates padding CID to execute the dummy allocations. At block 505, control signal transmissions are initiated. The process ends at block 506.

In the flow charts above, one or more of the methods may be embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Generally, the above describe and illustrated embodiments provide a method and base station (with an executing utility) within a wireless communication system, which enables minimizing of slot wastage in the allocation of slots while providing wireless communication. A plurality of Hybrid Automatic Repeat Request (HARQ) regions are defined, utilizing one or more definition factors, for a transmission of control data. A downlink (DL) MAP is expanded based on a group of definition factors within the definition factors used to define the HARQ region. Then, a first group of slots of a region defined as a first individual HARQ region allocation in the DL MAP is overlapped with/by a second group of slots of a second region defined as a second individual HARQ region allocation in the DL MAP. The overlapping minimizes slot wastage, while preventing a data conflict between the overlapping slots.

In one embodiment, when a first subset of the first group of slots in the first individual HARQ region is given a data sub-burst allocation in the DL MAP, the overlapping includes allocating a first subset of the second group of slots in the second individual HARQ region with a dummy sub-burst allocation in the DL MAP, wherein said dummy sub-burst allocation prevents a data conflict. With this embodiment, the first subset in the first individual HARQ region represents an allocated bandwidth and said first subset in the second individual HARQ region represents an unallocated bandwidth.

In another embodiment, when a second subset of the first group of slots in the first individual HARQ region are not allocated sub-burst data, the overlapping includes enabling a sub-burst allocation for a second subset of the second group of slots in the second individual HARQ region in the DL MAP. With these two embodiments, the data sub-burst allocation represents an allocated bandwidth, a dummy sub-burst allocation represents a first unallocated bandwidth, and a collection of slots which are not allocated for data sub-burst represents a second unallocated bandwidth.

In one embodiment, the dummy sub-burst allocation is made on padding connection identifier (CID), and the method (and base station) further includes instructing a PHY to prevent a transmission of a data sub-burst for a group of slots given the dummy sub-burst allocation. The method also includes enabling a communication between an base station or access point and a mobile station of one or more of a group of sub-frames, which include one or more of a HARQ region, a non-HARQ region, and a MAP overhead region.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. An apparatus for practicing the invention could be one or more processing devices and storage systems containing or having network access to program(s) coded in accordance with the invention. Thus, it is important that while an illustrative embodiment of the present invention is described in the context of a fully functional communication system (and/or base station controller) with installed (or executed) software, those skilled in the art will appreciate that the software aspects of an illustrative embodiment of the present invention are capable of being distributed as a computer program product.

Also, while the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a wireless communication system, a method comprising:
    defining a plurality of Hybrid Automatic Repeat Request (HARQ) regions for a transmission of control data, said HARQ regions being defined utilizing one or more definition factors;
    expanding a downlink (DL) MAP based on a group of definition factors within the definition factors used to define the HARQ region; and
    overlapping a first group of slots of a region defined as a first individual HARQ region allocation in the DL MAP by a second group of slots of a region defined as a second individual HARQ region allocation in the DL MAP while preventing a data conflict between the overlapping slots.

2. The method of claim 1, wherein the overlapping further comprises:
    when a subset of the first group of slots in the first individual HARQ region is given a data sub-burst allocation in the DL MAP, allocating a subset of the second group of slots in the second individual HARQ region overlapping with the subset of the first group of slots with a dummy sub-burst allocation in the DL MAP, wherein the dummy sub-burst allocation prevents a data conflict;
    wherein the subset in the first individual HARQ region represents an allocated bandwidth and the subset in the second individual HARQ region represents an unallocated bandwidth.

3. The method of claim 2, wherein the dummy sub-burst allocation is made on padding connection identifier (CID), and the method further comprises instructing a physical layer to prevent a transmission of a data sub-burst for a group of slots given the dummy sub-burst allocation.

4. The method of claim 1, wherein the overlapping further comprises:
    when a subset of the first group of slots in the first individual HARQ region are not allocated sub-burst data, enabling in the DL MAP a sub-burst allocation for a subset of the second group of slots in the second individual HARQ region overlapping with the subset of the first group of slots;
    wherein a data sub-burst allocation represents an allocated bandwidth and a collection of slots which are not allocated for data sub-burst represents an unallocated bandwidth.

5. The method of claim 1, further comprising enabling a communication between an access point and a mobile station of one or more of a group of sub-frames, which include one or more of a HARQ region, a non-HARQ region, and a MAP overhead region.

6. The method of claim 1, wherein a HARQ region is defined by one or more definition factors from among: a starting symbol; a starting sub-channel number for the HARQ region; a first number of symbols to define a first dimension of the region; a second number of sub-channels to define a second dimension of the region; a starting sub-channel number for a major sub-channel group within the HARQ region, corresponding to an allocated sub-burst; an ending sub-channel number for the major sub-channel group within the HARQ region, corresponding to the allocated sub-burst; a sequence number pertaining to an order in which a sub-burst is allocated within the HARQ region; a slot duration for the sub-burst allocated within the region; and a maximum number of sub-bursts.

7. A base station controller for facilitation wireless communication, the controller comprising:
    a processor;
    a memory component having stored thereon a utility which when executed by the processor provides the functions of:
        defining a plurality of Hybrid Automatic Repeat Request (HARQ) regions for a transmission of control data, the HARQ regions being defined utilizing one or more definition factors;
        expanding a downlink (DL) MAP based on a group of definition factors within the definition factors used to define the HARQ region; and
        overlapping a first group of slots of a region defined as a first individual HARQ region allocation in the DL MAP by a second group of slots of a region defined as a second individual HARQ region allocation in the DL MAP while preventing a data conflict between the overlapping slots.

8. The base station controller of claim 7, wherein the overlapping further comprises the functions of:
    when a subset of the first group of slots in the first individual HARQ region is given a data sub-burst allocation in the DL MAP, allocating a subset of the second group of slots in the second individual HARQ region overlapping with the subset of the first group of slots with a dummy sub-burst allocation in the DL MAP, wherein the dummy sub-burst allocation prevents a data conflict;
    wherein the subset in the first individual HARQ region represents an allocated bandwidth and the subset in the second individual HARQ region represents an unallocated bandwidth.

9. The base station controller of claim 8, wherein the dummy sub-burst allocation is made on padding connection identifier (CID), and wherein the utility further executes to provide the function of instructing a PHY to prevent a transmission of a data sub-burst for a group of slots given the dummy sub-burst allocation.

10. The base station controller of claim 7, wherein the overlapping further comprises the functions of:
    when a subset of the first group of slots in the first individual HARQ region are not allocated sub-burst data, enabling in the DL MAP a sub-burst allocation for a subset of the second group of slots in the second individual HARQ region overlapping with the subset of the first group of slots;
    wherein a data sub-burst allocation represents an allocated bandwidth and a collection of slots which are not allocated for data sub-burst represents a second unallocated bandwidth.

11. The base station controller of claim 7, wherein utility further executes to provide the function of enabling a communication between an access point and a mobile station of one or more of a group of sub-frames, which include one or more of a HARQ region, a non-HARQ region, and a MAP overhead region.

12. The base station controller of claim 7, wherein a HARQ region is defined by one or more definition factors, from among: a starting symbol; a starting sub-channel number for the HARQ region; a first number of symbols to define a first dimension of the region; a second number of sub-channels to define a second dimension of the region; a starting sub-channel number for a major sub-channel group within the HARQ region, corresponding to an allocated sub-burst; an ending sub-channel number for the major sub-channel group within the HARQ region, corresponding to the allocated sub-burst; a sequence number pertaining to an order in which a sub-burst is allocated within the HARQ region; a slot duration for the sub-burst allocated within the region; and a maximum number of sub-bursts.

13. A system for enabling efficient transmission of control data within a wireless communication system, the system comprising:
a processor;
a memory component having stored thereon a utility which when executed by the processor provides the functions of:
defining a plurality of Hybrid Automatic Repeat Request (HARQ) regions for a transmission of control data, the HARQ regions being defined utilizing one or more definition factors;
expanding a downlink (DL) MAP based on a group of definition factors within the definition factors used to define the HARQ region; and
overlapping a first group of slots of a region defined as a first individual HARQ region allocation in the DL MAP by a second group of slots of a region defined as a second individual HARQ region allocation in the DL MAP while preventing a data conflict between the overlapping slots.

14. The system of claim 13, wherein the overlapping further comprises the functions of:
when a subset of the first group of slots in the first individual HARQ region is given a data sub-burst allocation in the DL MAP, allocating a subset of the second group of slots in the second individual HARQ region overlapping with the subset of the first group of slots with a dummy sub-burst allocation in the DL MAP, wherein the dummy sub-burst allocation prevents a data conflict;
wherein the subset in the first individual HARQ region represents an allocated bandwidth and the subset in the second individual HARQ region represents an unallocated bandwidth.

15. The system of claim 14, wherein the dummy sub-burst allocation is made on padding connection identifier (CID), and wherein the utility further executes to provide the function of instructing a PHY to prevent a transmission of a data sub-burst for a group of slots given the dummy sub-burst allocation.

16. The system of claim 13, wherein the overlapping further comprises the functions of:
when a subset of the first group of slots in the first individual HARQ region are not allocated sub-burst data, enabling in the DL MAP a sub-burst allocation for a subset of the second group of slots in the second individual HARQ region overlapping with the subset of the first group of slots;
wherein a data sub-burst allocation represents an allocated bandwidth and a collection of slots which are not allocated for data sub-burst represents a second unallocated bandwidth.

17. The system of claim 13, wherein the utility further executes to provide the function of enabling a communication between an access point and a mobile station of one or more of a group of sub-frames, which include one or more of a HARQ region, a non-HARQ region, and a MAP overhead region.

18. The system of claim 13, wherein a HARQ region is defined by one or more definition factors, from among: a starting symbol; a starting sub-channel number for the HARQ region; a first number of symbols to define a first dimension of the region; a second number of sub-channels to define a second dimension of the region; a starting sub-channel number for a major sub-channel group within the HARQ region, corresponding to an allocated sub-burst; an ending sub-channel number for the major sub-channel group within the HARQ region, corresponding to the allocated sub-burst; a sequence number pertaining to an order in which a sub-burst is allocated within the HARQ region; a slot duration for the sub-burst allocated within the region; and a maximum number of sub-bursts.

* * * * *